United States Patent [19]

Gobran

[11] Patent Number: 5,227,185
[45] Date of Patent: Jul. 13, 1993

[54] ABRASION-RESISTANT COATING COMPOSITION AND ABRASION RESISTANT ENERGY CONTROL SHEET

[75] Inventor: Norma E. Gobran, Roseville, Minn.

[73] Assignee: Minnesota Mining and Manufacturing Company, St. Paul, Minn.

[21] Appl. No.: 895,345

[22] Filed: Jun. 8, 1992

[51] Int. Cl.$^5$ ............ B32B 15/08; B32B 17/10
[52] U.S. Cl. ................. 428/426; 428/441; 428/461; 428/520
[58] Field of Search ............ 428/426, 441, 520, 461

[56] References Cited

U.S. PATENT DOCUMENTS 4,226,910 10/1980 Dahlen et al. ................. 428/336
4,249,011 2/1981 Wendling ..................... 548/312
4,557,980 12/1985 Hodnett, III ................. 428/336

OTHER PUBLICATIONS

Hach's Chemical Dictionary, 3rd Ed., McGraw-Hill Book Co. Inc., N.Y., (1944) p. 416.

Primary Examiner—William J. Van Balen
Attorney, Agent, or Firm—Gary L. Griswold; Walter N. Kirn; Robert W. Sprague

[57] ABSTRACT

A laminate comprising a polyolefin film having a hardened coating adhered to one surface thereof. The coating is abrasion resistant and is the photopolymerization reaction product of starting materials comprising hydantoin hexacrylate and a fluorinated surfactant. The laminate finds particularly useful application as a component of energy control window films. An abrasion resistant coating composition is also disclosed.

14 Claims, 1 Drawing Sheet

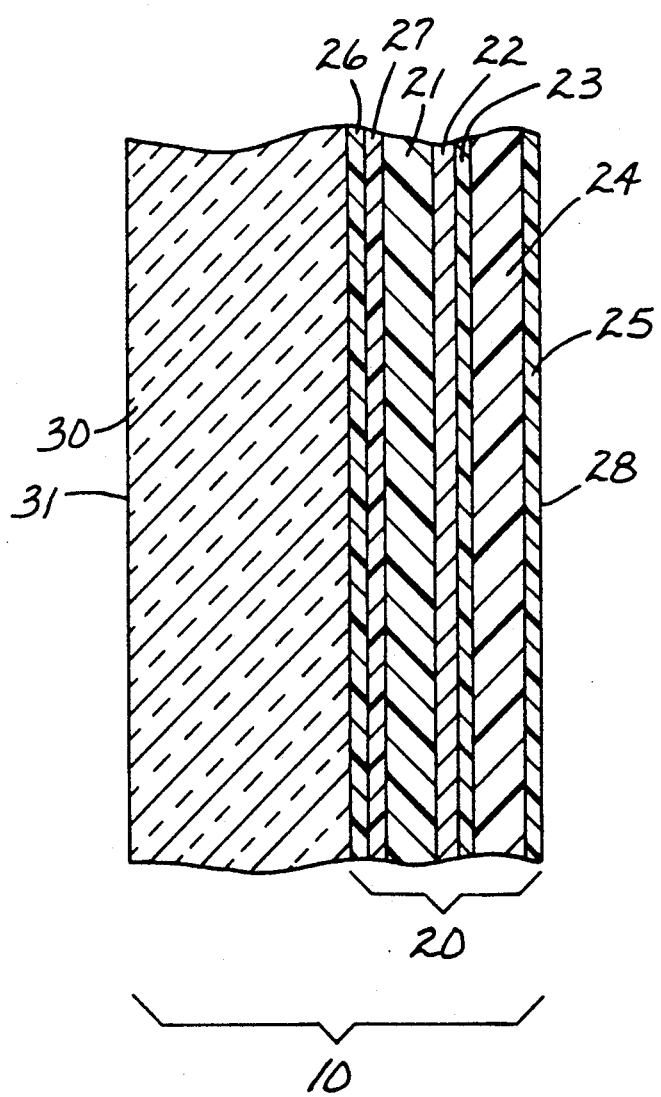

ABRASION-RESISTANT COATING COMPOSITION AND ABRASION RESISTANT ENERGY CONTROL SHEET

TECHNICAL FIELD

This invention relates to a hardenable composition, and coatings and laminates prepared therefrom.

BACKGROUND OF THE INVENTION

U.S. Pat. No. 4,226,910 discloses an energy control sheet comprising in contiguous order i) a transparent polymeric support foil which has low transmission and high absorption properties with respect to infra-red energy; ii) a metal layer; and iii) a protective polymeric layer such as a polyolefin film to protect the metal layer. In col. 9, line 63 to col. 10, line 3, there is contemplated application of a coating to the exposed surface of the protective polymeric layer to enhance the abrasion-resistance of the energy control sheet. However, there is no disclosure of any specific coating.

U.S. Pat. No. 4,557,980 discloses a radiation curable coating for a metal or non-metal substrate. Emphasized are metallized films used for energy control. The coating comprises i) a triacrylate or tetracrylate; and ii) acrylic acid.

U.S. Pat. No. 4,249,011 discloses photocurable compositions comprising hydantoin hexacrylate useful for providing solvent and abrasion resistant coatings.

BRIEF SUMMARY OF THE INVENTION

The present invention provides a novel laminate comprising a polyolefin film having first and second major surfaces and having adhered to the first major surface a hardened coating which is a photopolymerization reaction product of starting materials comprising hydantoin hexacrylate and a surfactant of the formula (I)

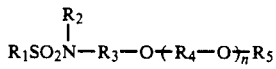

I wherein
  $R_1$ is a perfluoro alkyl group of about 4 to about 12 carbon atoms;
  $R_2$ is an alkyl group of 1 to about 4 carbon atoms;
  $R_3$ is a divalent, saturated hydrocarbon group of 2 to about 4 carbon atoms with at least 2 carbon atoms separating the adjacent N and O atoms;
  $R_4$ is a divalent, saturated hydrocarbon group of 2 to about 4 carbon atoms with at least 2 carbon atoms separating the adjacent O atoms;
  $R_5$ is hydrogen or an alkyl group of 1 to about 4 carbon atoms; and
  n is a number from 1 to about 12.

The present invention further provides an energy control sheet comprising the above laminate in combination with a transparent polymeric support foil having low transmission and high absorption properties with respect to infra-red energy and a transparent-reflective metal layer bonded to one surface of the transparent polymeric support foil. The exposed surface of the polyolefin film is bonded to the metal layer in such a construction to provide an energy control film exhibiting desirable properties.

The present invention still further provides a photohardenable composition for preparing an abrasion-resistant coating, comprising:
 a) 100 parts by weight of hydantoin hexacrylate;
 b) about 0.05 to about 1.5 parts by weight of a surfactant of the formula

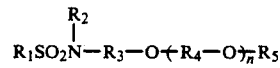

wherein
  $R_1$ is a perfluoro alkyl group of about 4 to about 12 carbon atoms;
  $R_2$ is an alkyl group of 1 to about 4 carbon atoms;
  $R_3$ is a divalent, saturated hydrocarbon group of 2 to about 4 carbon atoms with at least 2 carbon atoms separating the adjacent N and O atoms;
  $R_4$ is a divalent, saturated hydrocarbon group of 2 to about 4 carbon atoms with at least 2 carbon atoms separating the adjacent O atoms;
  $R_5$ is hydrogen or an alkyl group of 1 to about 4 carbon atoms; and
  n is a number from 1 to about 12; and
 c) an effective amount of a photoinitiator.

The combination of hydantoin hexacrylate and a surfactant of the above-specified type provides a composition which can be coated conveniently as a thin substantially discontinuity-free coating onto a polyolefin film. The coating can then be cured to a hardened state to provide a substantially distortion-free coating imparting a desirable level of abrasion resistance to the polyolefin film. When used to provide an abrasion resistant coating in an energy control sheet, desirably the energy control sheet exhibits a level of abrasion resistance greatly facilitating installation and cleaning, and providing for improved product lifetime. At the same time, the optical aesthetics of the film are enhanced since any scratches in the polyolefin film are substantially filled by the abrasion resistant coating and since the sheet is substantially free of undesired iridescent patterns.

BRIEF DESCRIPTION OF THE DRAWING

In the accompanying drawing, all thicknesses are greatly exaggerated to facilitate understanding.

The FIGURE is a cross-sectional view of a portion of one type of window unit incorporating the present invention.

DESCRIPTION OF PRESENTLY PREFERRED EMBODIMENTS

In the drawing, the FIGURE illustrates a window unit of the type where a composite energy control sheet of the invention is adhered to the inside face of a glazing unit. Also contemplated is a window unit of the type where the composite energy control sheet is located inside the glazing unit but is spaced therefrom, or a hermetically sealed double pane glazing unit in which an energy control film of the invention is adhered to the interior face of one of the panes, both such constructions being described in U.S. Pat. No. 4,226,910, incorporated herein by reference.

In the FIGURE, window unit 10 comprises composite energy control sheet 20 laminated to the inner face of single-pane glazing unit 30. Energy control sheet 20 comprises polymeric foil support layer 21, to one face of which is bonded transparent-reflective metal layer 22, which may be a vapor deposited layer of aluminum, silver, gold, copper, or any other suitable reflector of radiant energy over the solar and infra-red spectrum, i.e., 0.3-40 micrometer wavelength. As will be known by one skilled in the art, this metal layer preferably will have adequate transparency to visible light rays and good reflectivity of infra-red radiation.

Contiguous to metal layer 22 is a thin polymeric layer 24 comprising a polyolefin, which may be applied onto the metal layer, for example, by an extrusion or coating or by adhering a polyolefin film thereon by means of a thin layer of adhesive 23. Polymeric layer 24 is also transparent to infra-red radiation. Preferaby, the thickness of polymeric layer 24 should be at least 5 micrometers, and most preferably at least about 10 micrometers, and when the polymeric layer is applied by coating from a solvent, 5-15 micrometers is a fairly typical value. When preformed foils of the polymeric layer 24 are employed, it is likewise generally desired to employ thicknesses of at least about 5 micrometers (preferably at least about 10 micrometers to facilitate handling), but thicknesses as great as 25-50 micrometers can be employed successfully. It will be appreciated that the less the thickness of polymeric layer 24, the greater its infrared transmission. Likewise, of course, the less the thickness of adhesive layer 23, the less its absorption of infrared energy. Suitable polyolefins for use in providing polymeric layer 24 are polyethylene and polypropylene.

Abrasion resistant coating 25 protects the polymeric layer 24 from mechanical abrasion such as may result from handling or cleaning of the energy control sheet. Coating 25 is substantially transparent to infra-red radiation when used in the thin coatings of the preferred embodiment, and in the preferred embodiment is the photopolymerization reaction product of starting materials comprising 1,3-bis(3-[2,2,2-(triacryloyloxymethyl)ethoxy]-2-hydroxypropyl)-5,5-dimethyl-2,4-imidizolidinedione (referred to throughout the instant specification and claims as "hydantoin hexacrylate" and having the structure shown in Example 1 of U.S. Pat. No. 4,249,011, incorporated herein by reference), a photoinitiator, and a surfactant of Formula I above. Surfactants of Formula I and methods for making the same are disclosed in U.S. Pat. No. 2,915,554, incorporated herein by reference. The preferred surfactants are those having either the average structure II (most preferred)

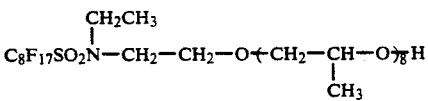

or the average structure III

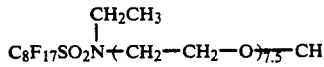

A preferred method for making the above surfactant of average structure II is as follows.

Sixty-six parts by weight of predominately N-ethyl-N-($\beta$-hydroxyethyl)perfluorooctanesulfonamide (containing minor amounts of corresponding $C_4$-$C_7$ perfluoroalkyl homologs) is heated to 150° F. in a stainless steel kettle. To the kettle is added with agitation 0.7 parts by weight of $BF_3$ etherate and the resulting mixture is mixed for 15 minutes. The kettle is then set at 140° F. (60° C.). To this mixture is then added 52.40 parts by weight of propylene oxide. The rate of addition is such that the reaction temperature is maintained at between 145°-150° F. (63°-66° C.). After propylene oxide addition is completed, the mixture is agitated for two hours at 140°-155° F. (60°-68° C.), or for such longer time as to bring the percent of the sulfonamide reactant to below 15% based on the original amount employed. To the mixture is then added slowly a mixture of 24 parts by weight of distilled water and 1.28 parts by weight of sodium carbonate. After completion of this addition, the mixture is agitated for thirty minutes. More sodium carbonate is added if necessary to bring the pH of the water phase to 7.0. Isopropyl ether, 17.6 parts by weight, is added to the kettle which is now set at 105° F. (41° C.). The resulting mixture is agitated for ten minutes at a rate sufficient to cause mixing of the phases, but not so great as to cause emulsification. After allowing the phases to separate for about one hour, the bottom (organic) phase is then isolated. The organic phase is washed three times with water to remove the catalyst and sodium carbonate, and the organic solvent is then distilled off under vacuum while keeping the temperature below 160° F. (71° C.) to provide the surfactant of structure II.

Referring again to the FIGURE, the surfactant of formula I in combination with hydantoin hexacrylate facilitates providing a substantially discontinuity-free coating which, when cured, adheres suitably to polymeric layer 24. Preferably, coating 25 is applied to polymeric layer 24 from an organic solution using, for example, methyl ethyl ketone as the solvent. The solvent is permitted to evaporate, and the coating is cured by exposure to ultraviolet light. Amounts of hydantoin hexacrylate, photoinitiator and surfactant employed in preparing the coating will generally be 100 parts by weight of hydantoin hexacrylate, about 1 to 8 parts by weight (preferably about 3 to 5 parts by weight) of the photoinitiator, and about 0.05 to 1.5 parts by weight (preferably by weight) of the surfactant. Coating 25, once cured, will generally have a thickness of about 0.9 to 2.3 micrometers, and preferably will have a thickness of about 1.3 to 1.8 micrometers.

Coating 25 may contain other ingredients provided such inclusion does not significantly impair the optical or hardness properties of the coating or significantly reduce the cure-rate to an impractical rate.

Composite energy control sheet 20 is adhered to the inside face of glazing unit 30 by means of adhesive layer 26, which may be any of those commonly used in the solar control industry today. For example, adhesive layer 26 may be an acrylate pressure-sensitive adhesive.

In order to minimize the deteriorative effect of ultraviolet light on any of the polymer layers in energy control sheet 20, it is highly desirable to interpose a coating 27, containing a UV absorber, between polymeric foil support layer 21 and adhesive layer 26; alternatively, a UV absorber may be incorporated in polymeric foil support layer 21 or adhesive layer 26.

In normal use, solar radiation is directed toward face 31 of glazing unit 30, passing through glazing unit 30, adhesive layer 26, UV-absorbing layer (if present) and polymeric foil support layer 21. A significant amount of the solar radiation (including rays in both the visible spectrum and the near infra-red spectrum) is then reflected from metal layer 22 back through polymeric foil support layer 21, UV-absorbing layer 27 (if present), adhesive layer 26 and glazing unit 30, thereby reducing the light level, as well as heat and glare inside the room in which window unit 10 is employed. While glare and heat transmission into the room are greatly reduced, sufficient light is transmitted into the room through metal layer 22, adhesive layer 23 (if present), polymeric layer 24 and abrasion resistant coating 25 to permit normal activities to be carried on in comfort. Some solar energy is absorbed in the glazing unit 30, where it is converted to heat and re-transmitted outside.

When the temperature outside window unit 10 falls significantly below the temperature inside the room, different factors come into play. All objects and persons inside a room may be considered to have a surface temperature of approximately 300° K. and hence to function as black body radiators, emitting energy in the infra-red spectrum, covering a wave length of approximately 4-40 micrometers. Because of the temperature difference between the opposite sides of window unit 10, there is then a normal tendency to lose heat from the room by the process of radiation. Such infra-red energy is radiated toward the outside, being directed toward the inner surface 28 of the window unit 10, where it passes first through abrasion resistant coating 25 and polymeric layer 24, and then encounters metal layer 22, whereupon it is reflected back through polymeric layer 24 and abrasion resistant coating 25 into the room.

Energy control sheets of the type illustrated in the FIGURE are mounted so that the abrasion resistant coating 25 is adjacent and in contact with the atmosphere within the room and polymeric support foil layer 21 is adjacent glazing unit 30.

In the following example, all parts are by weight unless otherwise noted.

EXAMPLE 1

A support film of biaxially oriented polyethylene terephthalate (PET) film, 25-micrometer thick (available from ICI Americas, Inc.), was vapor coated with aluminum to a sheet resistance of approximately 9 ohms/square using standard vapor coating techniques. The visible spectrum transmission of the aluminum-coated film was approximately 0.18 at 0.55 micrometer wavelength.

A 3.7:1 (w/w) toluene:methyl ethyl ketone (MEK) solution of a tack-free, polyester laminating adhesive was prepared which contained 6.0% by weight of Vitel PE-307 TM (available from Goodyear Chemicals), 0.5% by weight of Irgastab TM 2002 (a stabilizer which protects the construction from degradation by ultraviolet light and is available from Ciba-Geigy Corporation) and 0.3% by weight of Mondur TM CB-75 (a curing agent available from Mobay Chemical Company). The above solution was applied to the metallized face of the PET film. After the solvent was evaporated, a dry adhesive coating of approximately 0.8 gm/m$^2$ remained on the aluminum coated surface. A biaxially oriented isotactic polypropylene (PP) film, 12.7-micrometer in thickness (available from Hercules Inc.), which had been corona treated on one surface to a surface energy of 40-44 dynes/cm (using an apparatus available from Enercon Industries) was bonded to the adhesive-coated surface using a pair of squeeze rollers operating at 75° C. and 207 dynes/cm$^2$ (30 psi).

The exposed PP surface of the laminate structure was corona treated as above, and a solution consisting of hydantoin hexacrylate (100 parts, HHA), Irgacure TM 184 (4 parts, a photoinitiator available from Ciba-Geigy Corporation), and the fluorochemical surfactant of average structure II above (0.4 parts), in MEK (418 parts) was immediately applied to the treated PP surface following the corona treatment. The MEK was removed by passing the coated film through a circulating air oven operating at 49° C. (120° F.) leaving an HHA coating of approximately 1.8 gm/m$^2$. The HHA coating was cured by passing the laminate construction under three banks of 200 watts/inch medium pressure mercury UV lamps and a line speed of 100 ft/min (30.5 m/min) to produce an abrasion resistant coating. The distance between the lamps and the web was 12 cm.

A UV absorbent composition was prepared by combining 7.5 parts of a substituted benzophenone (either Uvinul TM M-493 or Uvinul TM D-50 available from BASF), 92.5 parts of the PET terpolymer available under the trade designation Vitel PE-222 from Goodyear Chemicals, and sufficient 50:50 (w/w) toluene:-MEK to prepare a 26% solids solution. The above solution was coated onto the unmetallized PET surface, and the solvent was evaporated by passing the coated film through a circulating air oven operating at 65° C. to provide a UV absorbent layer having a dry coating weight of 5.4 gm/m$^2$.

A pressure sensitive adhesive layer was applied to the UV absorbent layer by coating a 7% solids solution of a 96:4 isooctyl acrylate:acrylamide copolymer (according to Ulrich, U.S. Pat. No. Re. 24,906) in 50:50 isopropanol:ethyl acetate, the resulting coated laminate being passed through a circulating air oven operating at 105° C. to provide an adhesive layer having a coating weight of 2.7 gm/m$^2$. A 1.6% solids aqueous solution of methyl cellulose (Methocel TM A15LV available from Dow Chemical) was applied over the pressure-sensitive adhesive and the water evaporated by passing the coated film through a circulating air oven operating at 63° C. to provide a tack-free, water activatable adhesive energy control film in which the dried methyl cellulose coating was about 0.5 g/m$^2$.

EXAMPLES 2-3 AND COMPARATIVE EXAMPLES 1-4

The following screening process was conducted to determine the suitability of the surfactants listed in the TABLE below in providing desirable coatings prepared from hydantoin hexacrylate.

MEK solutions consisting of hydantoin hexacrylate (20 weight % based on % solids), Irgacure TM 184 (4 weight % based on % solids), and the indicated surfactant in the indicated amounts were coated onto the polypropylene surface of a laminated film using a #6 Meyer bar (wire wound rod). The coated laminates were allowed to stand for 3 minutes before curing in a processor equipped with one 300 watt/inch medium pressure mercury lamp and operating at a web speed of 50 ft./min. The cured coatings were inspected for presence of discontinuities present and the general appearance (i.e., aesthetics in relation to clarity expected from normal glazing) and the results were as indicated in the TABLE.

TABLE

| Example | Surfactant | % Surfactant | Discontinuities | General Appearance |
|---|---|---|---|---|
| Example 2 | surfactant II (above) | 0.4 | substantially none | good |
| Example 3 | surfactant III (above) | 0.4 | substantially none | good |
| Comparative Example 1 | Pluronic ™ L-121[a] available from | 0.4 | many large ones | relatively poor |
| Comparative Example 2 | Pluronic ™ L-121 | 1.0 | many large ones | relatively poor |
| Comparative Example 3 | Dow Corning X2-5211[b] | 0.4 | many large ones | relatively poor |
| Comparative Example 4 | Dow Corning X2-5211 | 1.0 | many large ones | relatively poor |

[a] a non-fluorinated polyoxypropylene available from BASF
[b] a nonionic polyoxyethylene modified polydimethylsiloxane

What is claimed is:

1. A laminate comprising a polyolefin film having first and second major surfaces and having adhered to said first major surface a hardened coating which is a photopolymerization reaction product of starting materials comprising hydantoin hexacrylate, a photoinitiator and a surfactant of the average structure

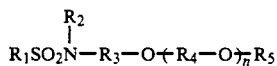

wherein
  $R_1$ is a perfluoro alkyl group of about 4 to about 12 carbon atoms;
  $R_2$ is an alkyl group of 1 to about 4 carbon atoms;
  $R_3$ is a divalent, saturated hydrocarbon group of 2 to about 4 carbon atoms with at least 2 carbon atoms separating the adjacent N and O atoms;
  $R_4$ is a divalent, saturated hydrocarbon group of 2 to about 4 carbon atoms with at least 2 carbon atoms separating the adjacent O atoms;
  $R_5$ is hydrogen or an alkyl group of 1 to about 4 carbon atoms; and
  n is a number from 1 to about 12.

2. A laminate according to claim 1, wherein said polyolefin film comprises polyethylene.

3. A laminate according to claim 1, wherein said polyolefin film comprises polypropylene.

4. A laminate according to claim 1, wherein said starting materials comprise 100 parts by weight of hydantoin hexacrylate and about 0.05 to about 1.5 parts by weight of said surfactant.

5. A laminate according to claim 1, wherein said surfactant is of the formula

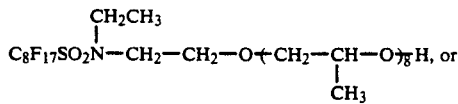

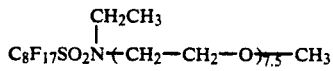

6. A laminate according to claim 1, further comprising a transparent polymeric support foil having low transmission and high absorption properties with respect to infra-red energy in the 4–40 micrometer wavelength and having a transparent-reflective metal layer bonded to one surface of said polymeric support foil, said metal layer being bonded to said second major surface of said polyolefin film.

7. A laminate according to claim 6, wherein said metal layer is bonded to said polyolefin film by means of a thin layer of adhesive.

8. A laminate according to claim 6, further comprising a layer of adhesive on the exposed surface of said polymeric support foil.

9. A laminate according to claim 6, wherein said polyolefin film comprises polyethylene.

10. A laminate according to claim 6, wherein said polyolefin film comprises polypropylene.

11. A laminate according to claim 6, wherein said starting materials comprise 100 parts by weight of hydantoin hexacrylate and about 0.05 to about 1.5 parts by weight of said surfactant.

12. A laminate according to claim 6, wherein said surfactant is of the formula

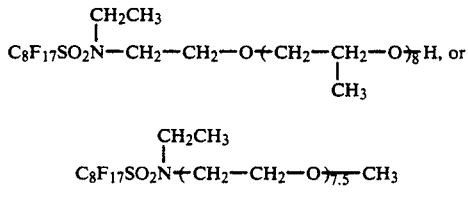

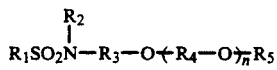

13. A window unit comprising the laminate of claim 6 bonded to glazing via adhesive bonding of the exposed surface of said polymeric support foil to said glazing.

14. A photohardenable composition for providing an abrasion-resistant coating, comprising:
  a) 100 parts by weight of hydantoin hexacrylate;
  b) about 0.05 to about 1 parts by weight of a surfactant of the formula $$R_1SO_2N-R_3-O(R_4-O)_nR_5$$
$$\phantom{R_1SO_2N-}|\phantom{R_3-O(R_4-O)_nR_5}$$
$$\phantom{R_1SO_2N-}R_2$$

wherein
  $R_1$ is a perfluoro alkyl group of about 4 to about 12 carbon atoms;
  $R_2$ is an alkyl group of 1 to about 4 carbon atoms;
  $R_3$ is a divalent, saturated hydrocarbon group of 2 to about 4 carbon atoms with at least 2 carbon atoms separating the adjacent N and O atoms;
  $R_4$ is a divalent, saturated hydrocarbon group of 2 to about 4 carbon atoms with at least 2 carbon atoms separating the adjacent O atoms;
  $R_5$ is hydrogen or an alkyl group of 1 to about 4 carbon atoms; and
  n is a number from 1 to about 12; and
  c) an effective amount of a photoinitiator.

UNITED STATES PATENT AND TRADEMARK OFFICE
CERTIFICATE OF CORRECTION

PATENT NO. : 5,227,185
DATED : July 13, 1993
INVENTOR(S) : Norma E. Gobran

It is certified that error appears in the above-identified patent and that said Letters Patent is hereby corrected as shown below:

Col. 4, line 41   "(preferably by weight)" should be

--(preferably about 0.2 to 0.8 parts by weight)--

Signed and Sealed this

Fifteenth Day of February, 1994

Attest:

BRUCE LEHMAN

Attesting Officer   Commissioner of Patents and Trademarks